United States Patent [19]

Uyeda et al.

[11] Patent Number: 4,780,032
[45] Date of Patent: Oct. 25, 1988

[54] KEY DUPLICATING APPARATUS

[75] Inventors: Tim M. Uyeda, Rosemead; Peter J. Phillips, Redondo Beach, both of Calif.

[73] Assignee: Klaus W. Gartner, Palos Verdes Estates, Calif. ; a part interest

[21] Appl. No.: 18,598

[22] Filed: Feb. 25, 1987

[51] Int. Cl.⁴ .............................................. B23C 1/16
[52] U.S. Cl. ................................. 409/82; 51/100 R; 76/110
[58] Field of Search ............... 409/81, 82, 83; 76/110; 51/100 R

[56] References Cited

U.S. PATENT DOCUMENTS

| | | | |
|---|---|---|---|
| 2,757,578 | 8/1956 | Savcedd | 409/82 |
| 3,011,411 | 12/1961 | Raymond | 409/82 |
| 3,430,535 | 3/1969 | Haggstrom | 409/83 |
| 4,012,991 | 3/1977 | Uyeda | 409/81 |
| 4,117,776 | 11/1978 | Uyeda | 409/82 |
| 4,188,163 | 2/1980 | Juskevic | 409/82 |
| 4,251,173 | 2/1981 | Saucedo | 409/82 |
| 4,256,423 | 3/1981 | Juskevic | 409/81 X |

FOREIGN PATENT DOCUMENTS

| | | | |
|---|---|---|---|
| 17053 | 10/1980 | European Pat. Off. | 409/81 |
| 470112 | 8/1914 | France | 409/81 |
| 915361 | 11/1946 | France | 409/81 |
| 6579 | of 1914 | United Kingdom | 409/82 |

Primary Examiner—William R. Briggs
Attorney, Agent, or Firm—Poms, Smith, Lande & Rose

[57] ABSTRACT

A key duplicating apparatus is disclosed which includes a base and platform supporting a reciprocating carriage assembly and a pivotally mounted housing. The carriage assembly has a key securement means which secures a blank key and a template key in alignment for positioning, respectively, with a notch cutting means and a notch depth indicating means, so that a template key may be duplicated by cutting notches of a predetermined depth and position into the shank portion of the blank key.

The duplicate key may be cut by use of the template key as a pattern, with a guide cam affixed to the indicating means aligned with a cutter wheel affixed to the notch cutting means. Alternatively, the guide cam may have indicia about its circumference, which may be used to "dial" and decode a manufacturer's code for the purpose of creating a duplicated key. As the guide cam is rotated, the invention may be used to cut a duplicate key from the notch pattern presented in the code.

11 Claims, 7 Drawing Sheets

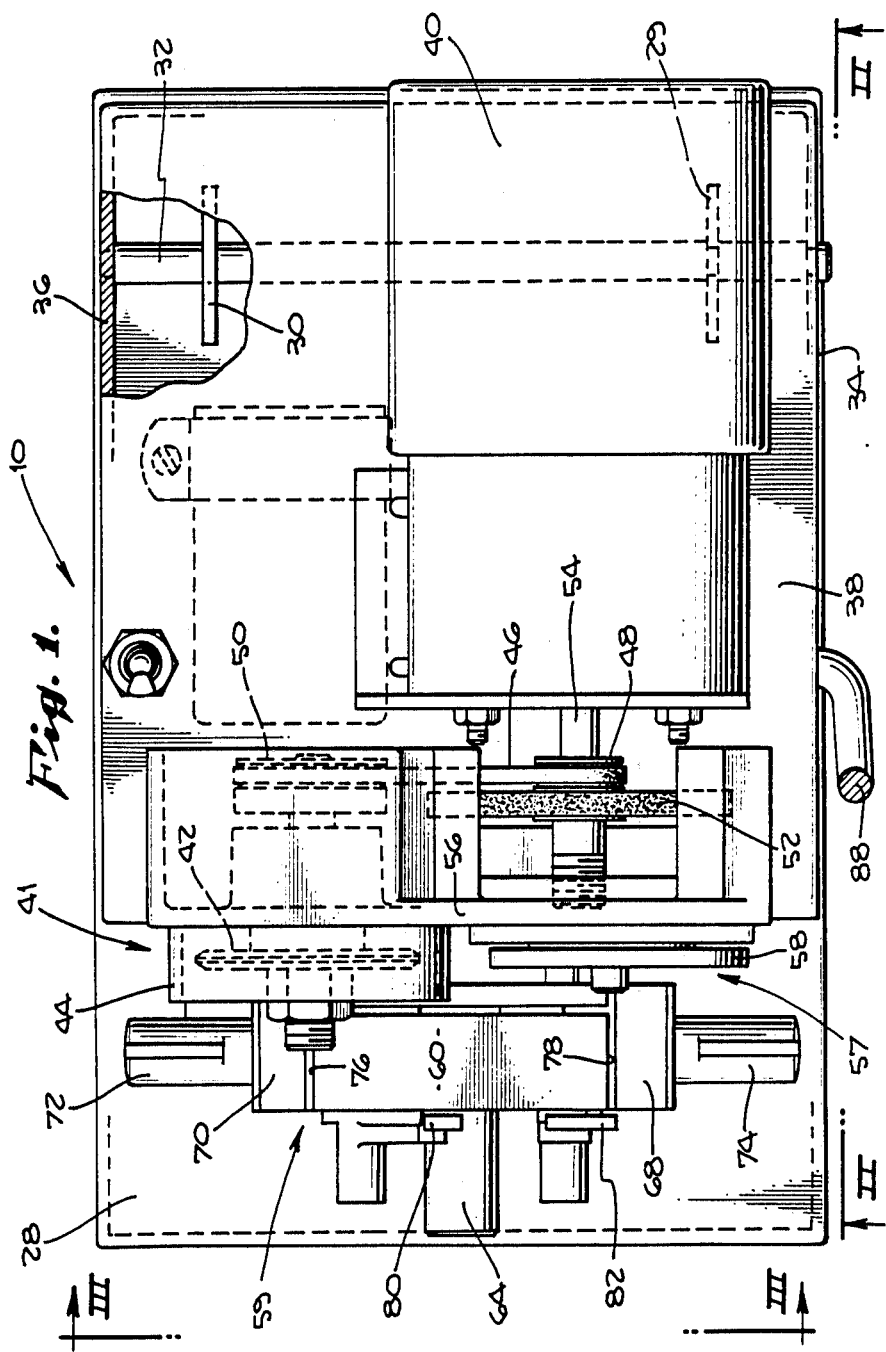

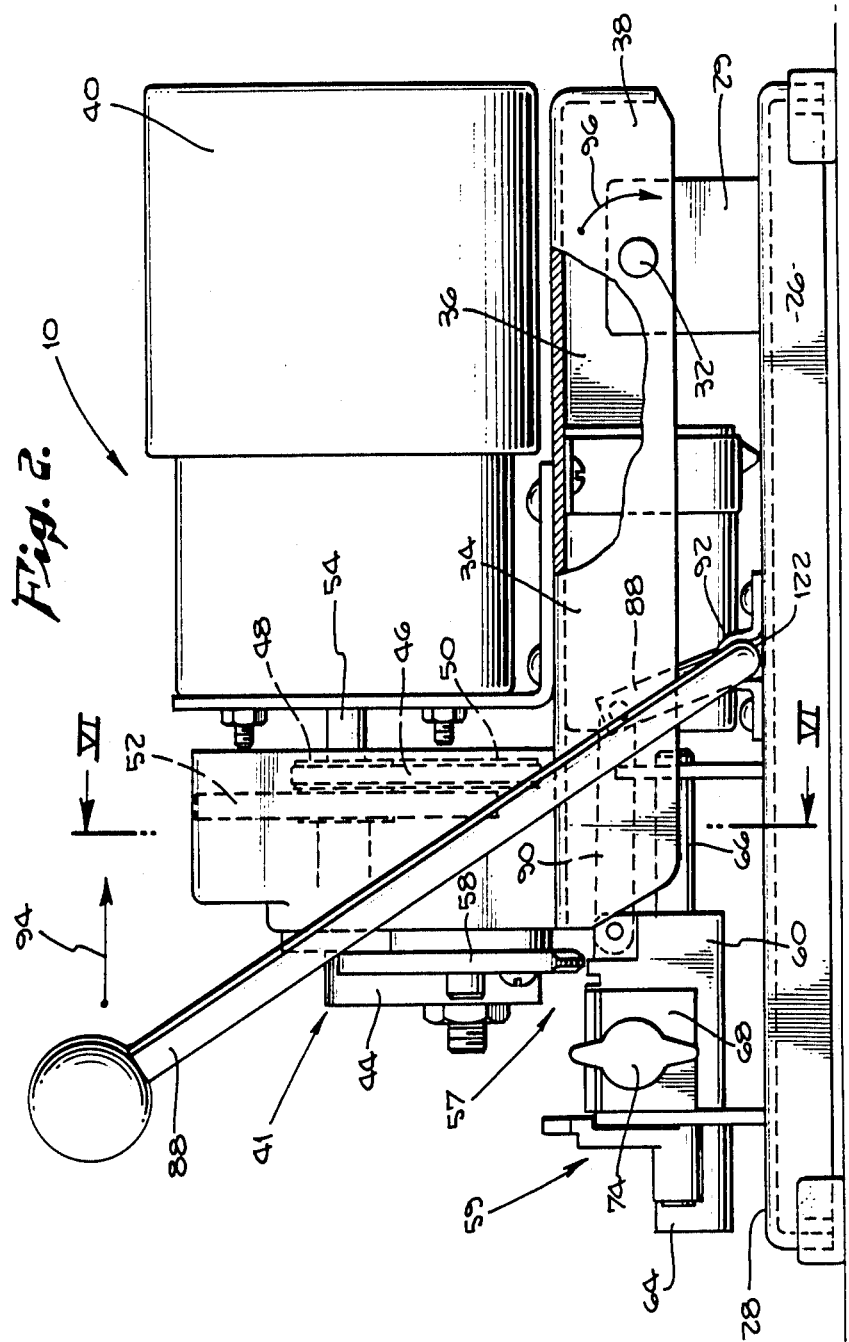

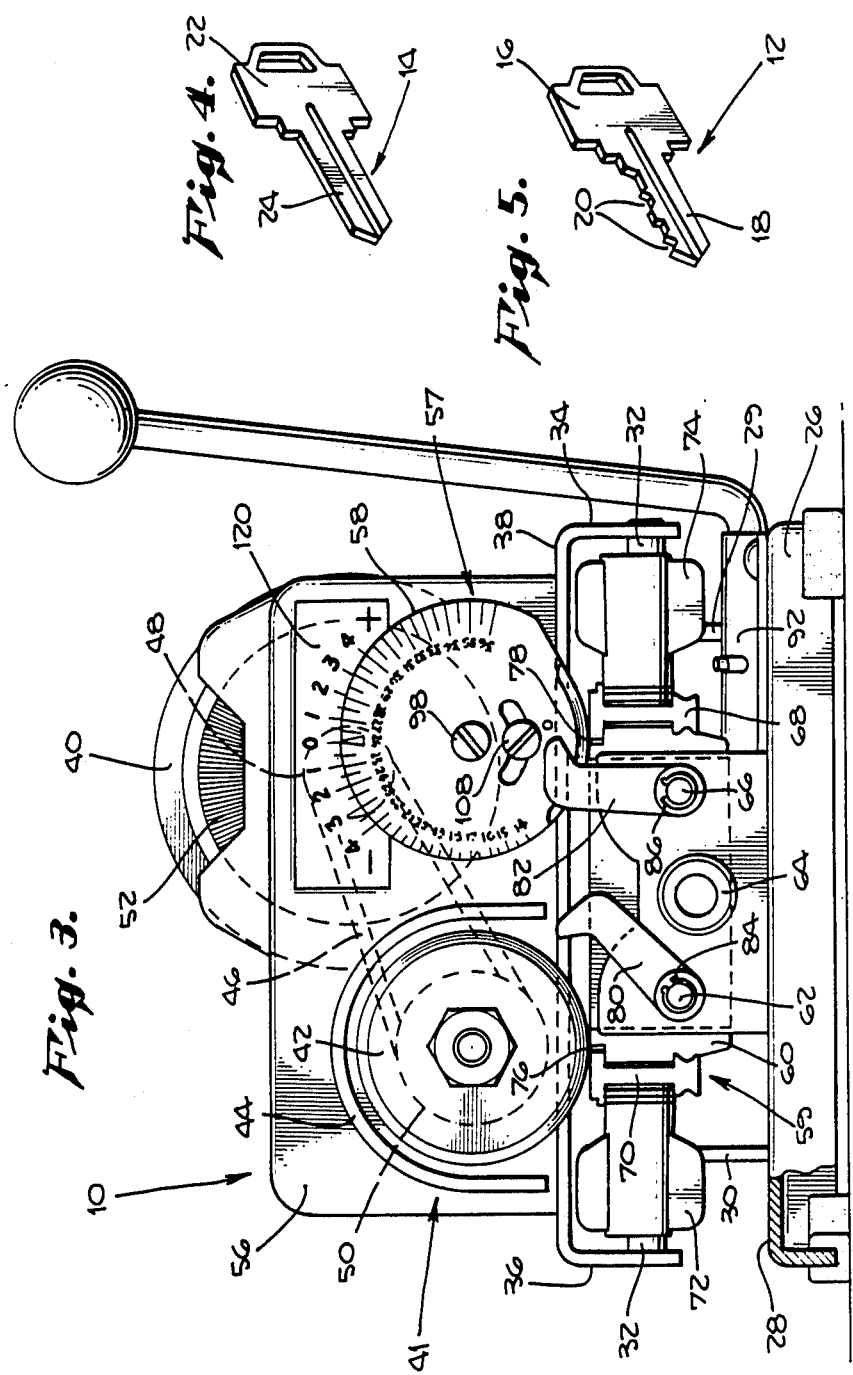

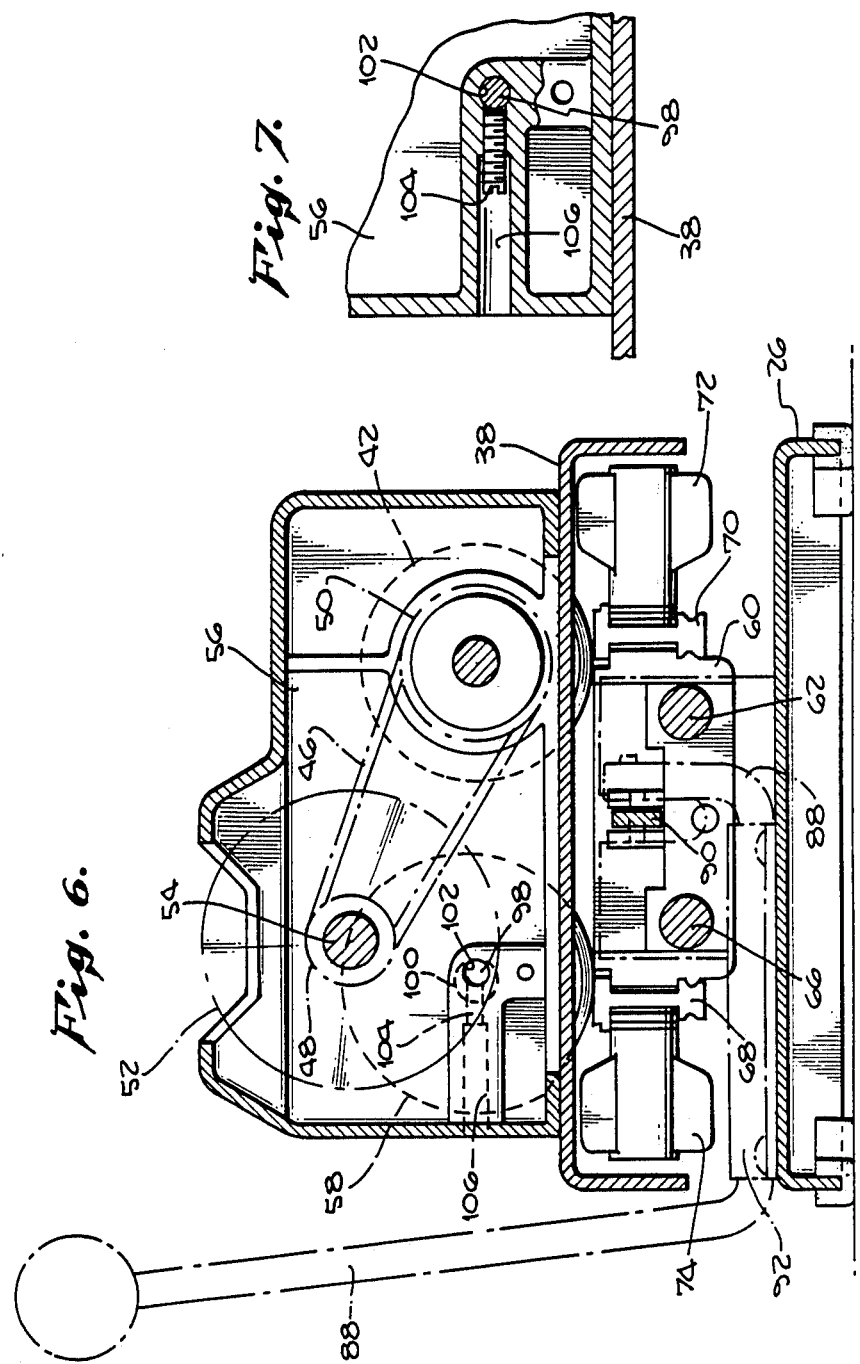

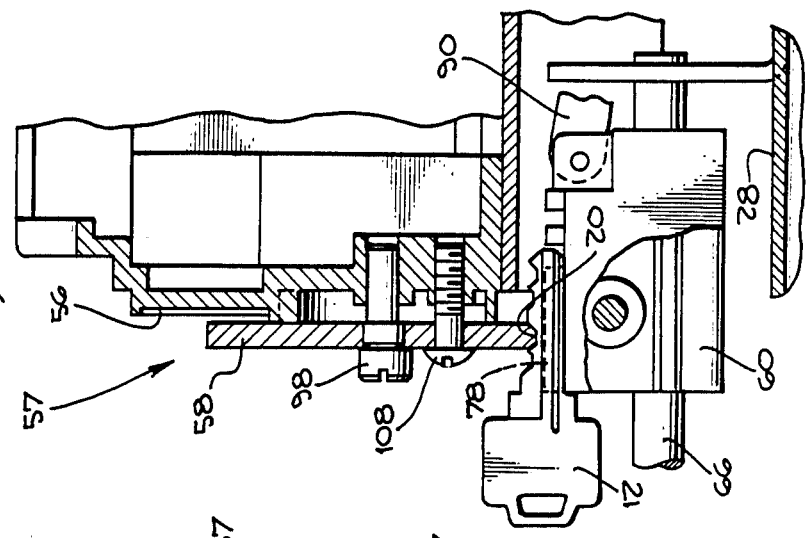

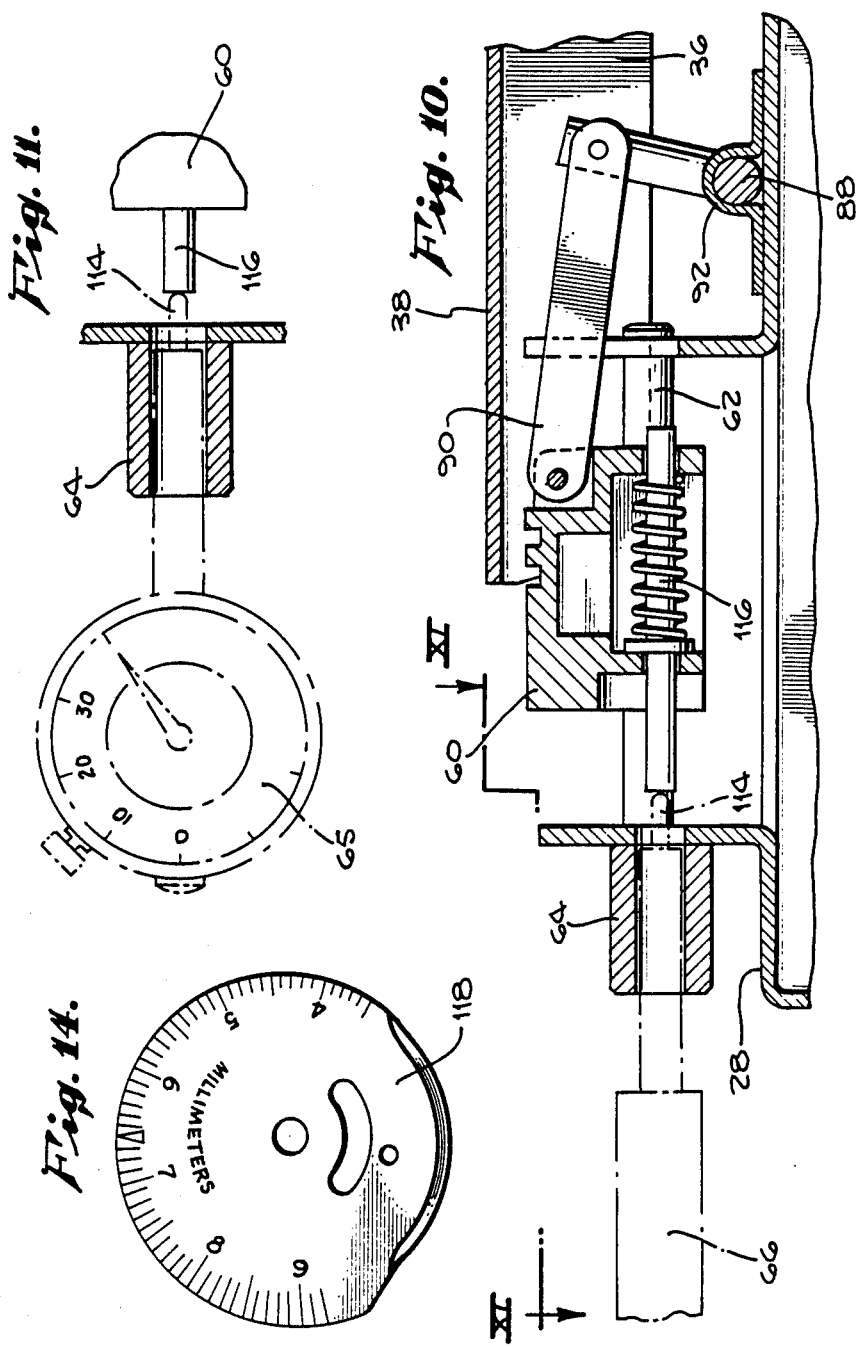

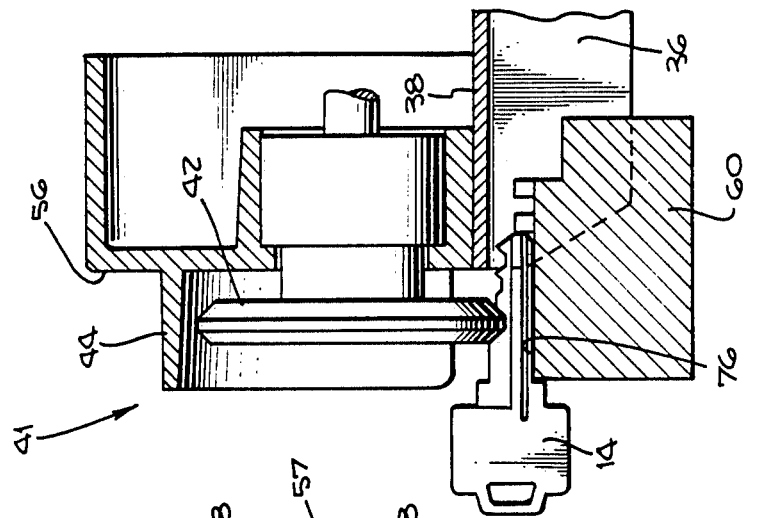
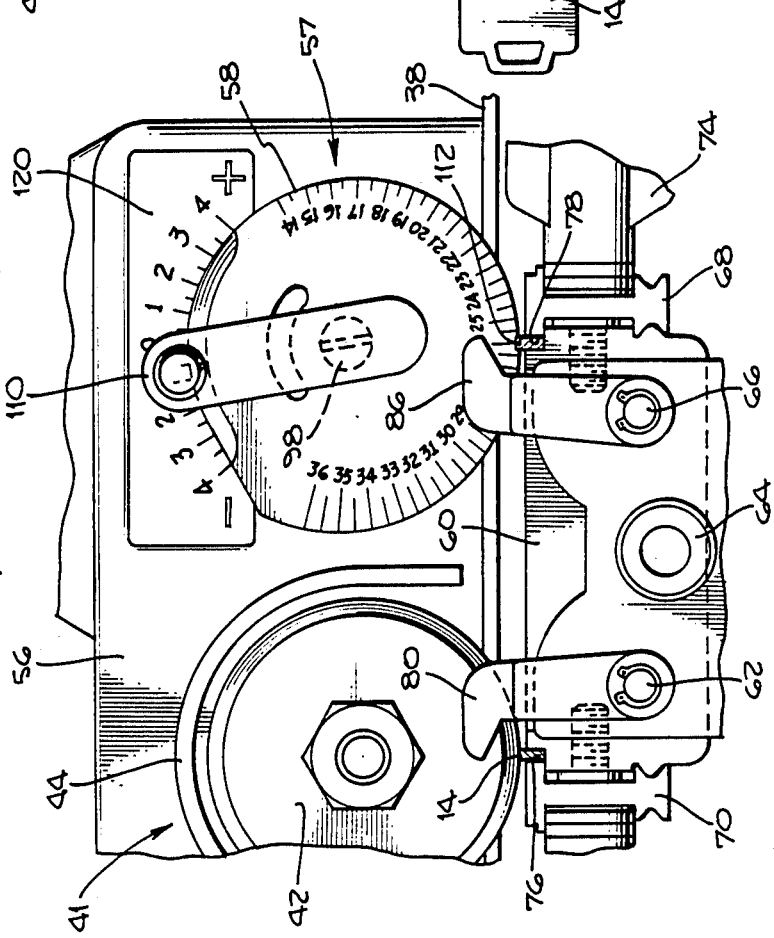

KEY DUPLICATING APPARATUS

FIELD OF THE INVENTION

This invention relates to a key duplicating apparatus; and more particularly, to an apparatus for duplicating keys using a template key or a manufacturer's code.

BACKGROUND OF THE INVENTION

Keys are generally manufactured uniformly by the same manufacturer with regard to the depth and position of notches cut along the shank portion of a key. Conventional keys, having a plurality of spaced notches cut along the key's shank portion, may be duplicated by using a template key to provide a pattern for a cutter wheel which will form a duplicate key from a blank key. Alternatively, key duplicating machines have heretofore been available which may manufacture duplicate keys using a coded number assigned to the template key. Each manufacturer makes its keys according to a predetermined pattern, and creates a code to match the particular characteristics of the key, such as depth of the notches and distance between the notches spaced longitudinally along the shank of the template key. The duplicating machine may then be used to decode the coded template key, so that a duplicate key may be made using only the code without any need to physically trace the template key notches. Heretofore, such a decoding duplicating machine was complicated and required detail code information to effectuate a duplication. Examples of prior art key duplication apparatus include U.S. Pat. Nos. 4,012,991 and 4,117,763 issued to the inventor of this disclosure.

Additionally, alignment of the template key with the key shank of the blank is a necessary step in order to duplicate a key from a blank using the template key. In order to achieve alignment of the duplicated key and the original template key, a notch-positioning means must be used to bring the key cutter wheel into proper positioning to cut the duplicate key. If the master template key is cut improperly or is not available, the decoding cutter must fairly and accurately follow the template key code to create a duplicate key without the benefit of a template key. Conventional duplication machines using a coded template key have been complicated and not easily adjustable. What is needed is a simplified key duplication mechanism which also may operate based upon a manufacturer's code or by use of a template key. The ability of a key duplication machine to make duplicate keys based upon only a code is significant in view of the fact that exact duplication from a template key is not always possible, especially where the template key is itself a duplicate.

SUMMARY OF THE INVENTION

It is an object of this invention to provide an apparatus for duplicating a key which simply may duplicate a key from a blank where the key cut is made by use of a template key or coded information indicative of notch depth, as well as notch-positioning along the shank of the duplicated key.

In furtherance of this objective, an apparatus for duplicating a key from a template key or a code is disclosed which has a base and platform supporting the key duplication machinery. Included in the duplication apparatus is a reciprocally movable assembly mounted on the platform. A pivotally mounted housing is placed on the platform as well, so that as the movable assembly slides reciprocally across the platform, the pivotally mounted housing may be raised or lowered to be brought into registered contact with the movable assembly. The movable assembly is preferably a carriage block which slides reciprocally along at lease a single elevated guiderail. Affixed to either side of the carriage block are I-beam-shaped members, which may adjustably be pressed against or withdrawn from the sides of the carriage block by a pair of set screws. The interface between each of the I-beam members and the carriage is used to securely position a template key and a blank key so that each may rigidly remain in place while the cutter wheel is brought into contact with the blank key to make a duplicate of the template key.

The pivotal mounted housing includes the cutter wheel and a key indexing eccentrically mounting notch-positioning guide cam. Indicia on the notch-positioning guide cam may be used to align this wheel with the cutter wheel, and may also be used to decode a key code in order to duplicate a key without use of the physical template key. The guide wheel has a curved slot to allow adjustment of the positioning of the wheel. Adjacent the guide wheel and mounted on the pivotal housing is a belt-driven cutter wheel, this cutter wheel being driven by a universal AC-DC motor in the preferred embodiment. The motor has a brush affixed to its spindle which may be used to clean burrs and scrape away from the pivotal housing keeping the cutting plane of the housing clean. In addition to indicia on the guide cam, the upper forward housing may bear sequentially marked indicia useful in referencing the adjustably positionable guide cam.

The key(s) are additionally secured to the carriage block by key securement pawls which lock onto and shoulder the keys. The carriage block may preferably be reciprocated by a hand lever which provides rectilinear linkage to allow remote control of the carriage block position.

When the key duplication apparatus is used to decode a master key, a handle may be affixed to the indicia-bearing guide cam to allow remote control of the guide cam position as the coded key notch depth is encoded into the duplicate key. In this manner, the guide cam may be considered as interchangeable as an alignment tool and a decoding instrument. The guide cam's eccentric positioning may be adjusted and secured by a set screw which pins the shaft securing the guide cam one of a plurality of positions about the center of the cam.

The foregoing advantages and improvements represented by the subject invention may best be described in further detail by a brief description of the drawings and a detailed description of the preferred embodiment.

BRIEF DESCRIPTION OF THE DRAWINGS

FIG. 1 shows a top plan view of the key duplicating apparatus which is the subject of this invention.

FIG. 2 is a side elevational view of the invention taken along line II—II of FIG. 1.

FIG. 3 is a front elevational view of the invention taken along lines III—III of FIG. 1.

FIG. 4 is a perspective view of a blank key from which a duplicate will be cut by the apparatus of this invention.

FIG. 5 is a perspective view of a template key which may serve as a pattern for a duplicate key cut from the blank key of FIG. 4.

FIG. 5 is an elevational cross-sectional view of the invention taken along line VI—VI of FIG. 2.

FIG. 7 is a sectional view showing the positioning of the adjustable screw which secures the guide cam 58 of FIG. 3 in a preselected eccentric position.

FIG. 8 is a fragmentary front elevational view of the invention.

FIG. 9 is a cross-sectional view of the invention taken along line IX—IX of FIG. 8.

FIG. 10 is a cross-sectional view of the invention taken along line X—X of FIG. 8.

FIG. 11 is a partial cross-sectional view of the invention taken along line XI—XI of FIG. 10 showing in shadow a longitudinal positioning measuring gage.

FIG. 12 is a cross-sectional view of the invention taken along line XII—XII of FIG. 8.

FIG. 13 shows an alternate embodiment of the invention to that shown in FIG. 8, where the guide cam 58 has a handle affixed to decode a key code for duplicating a key without direct use of a template key.

FIG. 14 is an alternative view of the indicia bearing guide cam 118 showing indicia measurements in millimeters instead of an inch code.

DETAILED DESCRIPTION OF THE PREFERRED EMBODIMENT

With reference to FIGS. 1-5, a key duplicating apparatus 10 (FIG. 2) is shown generally which is capable of duplicating a template key 12 (FIG. 5) by cutting a blank key 14 (FIG. 4) so that notches cut into the blank key 14 match the template key 12, and the newly made duplicate key (from blank key 14) operates to open the same lock as the template key 12 may open. Alternatively, the key duplicating apparatus 10 is designed to duplicate a key which will open the same lock that the template key 12 operates, but the duplicate is created without direct use of a template key; the apparatus 10 is able to decode a key and lock system identified by a manufacturer's code and cut a duplicate key from a blank key 14 without direct use of a template key 12.

It will be noted that the template key 12 that is to be copied by the apparatus 10 is a standard key having a head 16 and a shank 18. The shank 18 has a plurality of notches 20 arranged longitudinally along its length. Likewise, the blank key 14 has a head portion 22 and a shank portion 24, into which shank 24 the duplicating apparatus 10 will cut notches which will correspond to the notches 20 of the template key 12. It is, therefore, clear that when the key duplicating apparatus 10 is used to make a duplicate key from the blank key 14 which is a copy of template key 12, the template key 12 serves as a pattern which the apparatus 10 uses to cut notches into the blank key 14 which correspond to the notches 20 of template key 12. In particular, when the template key 12 serves as a pattern to be used by the key duplicating apparatus 10, the apparatus 10 carefully cuts notches into the shank 24 of the blank key 14 which correspond as to the depth and relative position along the length of the shank 24 to the notches 20 of the template key 12. When alternatively, no template key is directly used by the duplicating apparatus 10, the apparatus 10 acts to decode an available manufacturer's code having numerals which correspond to the parameters of notch depth and relative position and cut a duplicate key from the blank key 14 which is capable of operating the same lock as a template key 14 having the identical manufacturer's code.

With detailed reference to FIGS. 1-3 a fixed base 26 provides support for an elevated platform 28 (FIG. 2) which platform 28 supports two separate assemblies. The platform supports a pivotally mounted housing means and a reciprocally mounted key securement means. A pair of pivot support brackets 29 and 30 (see FIG. 1) support a pivot rod 32 which extends the width of the base 26, and passes through the respective sidewalls 34 and 36 of the pivotally mounted housing means 38. The motor means 40, the milling cutter wheel 42, the belt 46 and the pulley 48, as well as the wire brush 52 form the assembly comprising the notch cutting means 41. Secured to the pivotally mounted housing means 38 is a motor means 40 for driving the notch cutting means 41 and which may be a Universal AC-DC motor in the preferred embodiment. Also positioned on top of the pivotally mounted housing means 38 is the notch cutting means 41 comprising a milling cutter wheel 42 mounted on a forward wall 56 of the housing 38. The wheel 42 is surrounded by a milling shroud 44. The milling cutter wheel 42 may be driven by a belt and pulley arrangement, such as belt 46 which is channeled over pulley 48 and milling drive pulley 50 (FIG. 1). A wire brush 52 is affixed to the motor drive shaft 54 along with the pulley 48. The brush 52 acts to clean and remove particulate material that arises as a result of operating the key notching cutting means 41, in particular the milling cutter wheel 42.

Additionally, indicating means 57 for guiding the housing over the template key 12 or according to a code is provided and mounted on the forward wall 56 of the pivotally mounted housing means 38. Adjacent the milling cutter wheel 42 and also mounted on the forward wall 56 of the pivotally mounted housing is an indicia bearing key guide cam 58. When the key duplicating apparatus 10 is used to create a duplicate key from a blank key 14 by patterning the duplicate key after a template key 12, the indicia bearing guide cam 58 serves to align the milling cutter wheel 42 with the guide cam 58 so that the adjacently positioned template key and blank key will be in alignment for correct cutting the key and forming notches of a desired predetermined depth.

Seated immediately below the milling cutter wheel 42 and the indicia bearing key guide cam 58 is a reciprocally movable carriage assembly 59 which comprises a carriage block 60, guide rails 62, a pair of vice forming I-beams 68 and 70, and adjustable winged set screws 72 and 74. The carriage block 60 may be reciprocally moved along a pair of guide rails 62 and 66. Positioned forward from the carriage block 60 is a gage receiving tube 64 into which is inserted a gage 65 (see FIG. 11) so that the positioning longitudinally along the shank 24 of the duplicate key may be ascertained as the key is being cut and the carriage block 60 is moved.

On opposing sides of the carriage block 60 a pair of key securement I-beams 68 and 70 are each positioned to allow a close fitting against the respective sides of the carriage block 60. A pair of winged set screws 72 and 74, each positioned on the respective sides of the I-beams 70 and 68 opposite the carriage block 60, may be manually adjusted to precisely move the I-beams 68 and 70 reciprocally outward and inward from the carriage block 60. Movement of the I-beam 70 away from the carriage block 60 creates a space 76 into which the blank key 14 may be inserted and secured to the carriage block 60. Likewise rotation of the wing set screw 74 allows the I-beam 68 to move away from the carriage block providing a space for the insertion of the template key 12.

FIG. 8 shows an example of the blank key 14 and the template key 12 mounted each respectively within spaces 76 and 78 between the carriage block 60 and the key securement I-beams 68 and 70 positioned in lateral alignment for duplication. FIG. 9 shows a side view of the template key 12 as the guide cam 58 passes over the notches 20 of the template key. Each key may be additionally secured in position within the spaces 76 and 78 by each of a set of key securement pawls 80 and 82. The pawls 80 and 82 lock over the top of the shank of the keys 12 and 14 and prevent a rotational torque on either key causing misalignment. The key securement pawls 80 and 82 rotate about the forward end of the carriage block 60 and may be secured each to the end of the guide rail 62 and 66 by use of the wishbone sprockets 84 and 86.

The manual remote control lever arm 88 may be used by a link and pin assembly 90 to move the carriage block 60 along the guide rails 62 and 66. As the lever arm 88, secured to the floor 28 by bracket 92, is rotated pivotally about a point of contact 122 with the floor 28 (FIG. 2) at the bracket 92, link and pin assembly 90 is pulled in a first axial direction 94, which, in turn, pulls the carriage block 60 inwardly towards the cutter wheel 42 and the guide cam 58. As the lever is drawn against the first axial direction 94, the carriage block 60 is drawn outward and away from the cutter wheel 42 and the guide cam 58. As was mentiond earlier, the housing 38 is pivotally mounted at the rear end of the floor 28 of the base platform 26. The entire upper housing, including the motor means 40, the notch cutter means, and the guide cam 58 may all be pivoted in a counter-clockwise direction 96 (FIG. 2), thereby allowing the cutter cam 42 and the guide cam 58 to be lifted up and away from the carriage block 60 which contains the keys. By adjusting movement of the lever arm 88 and selectively pivoting the housing 38, very precise alignment of the template key 12 and the blank key 14 may be achieved in order to precisely duplicate the template key during the cutting operation.

FIG. 6 shows a cross-sectional view of the key duplicating apparatus 12 looking from the back of the apparatus outward toward the cutter wheel 42 and the guide cam 58. The guide cam is secured by an adjustable screw 98 to the forward wall 56 of the housing 38 by means of an eccentric mount 100. The particular positioning of the eccentric mount 100 around a defined circular perimeter 102 may allow the positioning of the guide cam 58 in a fixed position around the perimeter 102 by means of an adjustable screw 104 as shown in FIG. 7. The adjustable screw 104 locks screw 98 into an eccentric position in order to further align the guide cam 58. The adjustable screw 104 is positioned within a tubular passageway 106 defined within the forward wall 56 of the pivotally mounted housing 38. A zero setting adjustment screw 108 is also provided for use in the cutting mold which includes both a blank key 14 and a template key 12 so that the lower perimeter of the guide cam 58 may be adjustably positioned in alignment with the cutter wheel 42.

When it is desirable or necessary to cut a duplicate key from a blank key 14 without the use of a template key 12, the indicia bearing guidewheel 58 may be rotated approximately 180° into a second position, after first removing the zero adjust screw 108. A handle and rod assembly 110 may be affixed to the guide cam 58 so that one may dial in various coded positions in alignment corresponding to the tip locater pin 112 which is inserted into the space 78 previously occupied by the template key 12 so that the guide cam 58 may be kept in alignment with the cutter wheel 42 when a key is being cut through a decoding process.

As briefly discussed previously, a gage 66 may be used to determine the distance which the carriage block assembly 60 moves along the guide rails 66 and 62. The gage is inserted into the gage receiving tube 64 and has a plunger 114 protruding outward from the gage and inwardly against a spring-loaded shaft 116 so that a precise relative position distance along the shank 24 of the duplicating key may be determined while the blank key 14 is being cut by the cutter wheel 42.

FIG. 14 shows an alternative indicia bearing guide cam 118 which may be used in place of the guide cam 58 when the particular manufacturer's code is decodable in millimeters rather than in inches. Alignment of either the inch indicia bearing guide cam 58 or the millimeter indicia guide cam 118 is further insured by the presence of a zero fixing indicia bearing label 120 which may be placed on the forward wall 56 of the housing 38 in order to further fine tune the setting of the guide cam 58, whether the wheel is used in conjunction with the template key 12 or for purposes of decoding a key duplicating code to cut a duplicate key without the presence of a template key. In either event, the zero fixing indicia bearing label is useful to precisely align the guide wheel 58 to insure precise duplication of keys from templates or codes.

What is claimed is:

1. An apparatus for duplicating a coded template key, said key having a shank portion with a plurality of spaced transverse notches of differing depths and spacing between said notches; said key also having indicia written in a code format, said coded format corresponding to a predetermined depth for each notch and positional spacing between notches; said duplicating apparatus comprising:

a stationary platform supporting a pair of side plates which, in turn, support at least one guide rail;

a key securement means;

a reciprocally movable carriage mounted along said guide rail, said carriage including said key securement means;

said platform pivotally supporting an upper housing plate assembly, said housing plate assembly being hinged along at least one side to said platform;

a key indexing means, key notch cutting means, and motor means mounted on said housing plate assembly;

said assembly being movable relative to said carriage so that said key indexing and key notch cutting means may be juxtaposed with said key securement means of said carriage, so that a duplicate key may be made from a blank key held by said securement means from said coded template key;

said key indexing means has an indicia bearing decoder notch-positioning guide cam;

said key securement means having means for positioning and aligning said blank key with a milling cutter wheel affixed to said notch-cutting means;

said notch-positioning guide cam being aligned with said cutter wheel, the indicia on said notch-positioning guide cam corresponding to a code identifying the notch depth and angle of said coded template key, the notch-positioning cam indicia acting to decode the template key; whereby said cutter wheel cuts notches into said blank key following alignment of the notch-positioning guide cam as said notch-positioning guide cam is repeatedly set and reset to decode the template key code, according to the indicia on said notch-positioning guide cam, so that a duplicate key can be made from said blank key which corresponds to the template key code, where no template key is physically secured to the key securement means.

2. An apparatus for duplicating a coded template key, said key having a shank portion with a plurality of spaced transverse notches of differing depths and spacing between said notches; said key also having indicia written in a coded format, said coded format corresponding to a predetermined depth for each notch and positional spacing between notches; said duplicating apparatus comprising:
 a stationary platform supporting a pair of side plates which, in turn, support at least one guide rail;
 a key securement means;
 a reciprocally movable carriage mounted along said guide rail, said carriage including said key securement means;
 said platform pivotally supporting an upper housing plate assembly, said housing plate assembly being hinged along at least one side to said platform;
 a key indexing means, key notch cutting means, and motor means mounted on said housing plate assembly;
 said assembly being movable relative to said carriage so that said key indexing and key notch cutting means may be juxtaposed with said key securement means of said carriage, so that a duplicate key may be made from a blank key held by said securement means from said coded template key;
 a biased positioning gage for determining the longitudinal positioning of notches along the shank portion of the coded template key;
 said positioning gage connected to said movable carriage through an integral tubular protrusion extending outward from a forward wall of said carriage;
 said gage further comprising an elongated rod reciprocally movable against a biasing means at one end and a dial face gage at the other end of said rod, so that the relative position of the carriage along the guide rail may be measured and longitudinal positioning of notches along the shank portion of the template key and blank key may be accomplished.

3. An apparatus for duplicating a coded template key, having a shank including a plurality of pre-positioned notches along said shank, the depth and positioning of said notches corresponding to a first coded set of indicia on said key, said apparatus comprising:
 housing means movably mounted on a base;
 key securement means, securing at least a blank key, movably supported by said base;
 said housing means including means for key notch cutting and means for indicating key notch depth;
 said housing and said key securement means being movable with respect to one another such that said key notch cutting means is brought into register with said blank key according to said first coded set of indicia of said template key;
 said key notch depth indicating means including a second set of indicia mounted by a first adjustable screw in an eccentric position and coded to correspond to said first set of indicia of said template key, wherein said key notch cutting means, being aligned with said indicating means, cuts notches into said blank key a depth encoded according to settings on said second set of indicia of said indicating means;
 a third set of indicia is affixed to said housing;
 said third set of indicia providing a reference setting for resetting said key notch depth indicating means so that the second set of indicia on said indicating means may be zero-balanced in order to compensate for wear to said key notch cutting means;
 a key tip locator;
 said key securement means providing alignment of said blank key with said key tip locator, so that notches may be positioned along said blank key according to said first and second sets of coded indicia.

4. An apparatus for duplicating a coded template key, having a shank including a plurality of pre-positioned notches along said shank, the depth and positioning of said notches corresponding to a first coded set of indicia on said key, said apparatus comprising:
 housing means movably mounted on a base;
 key securement means, securing at least a blank key, movably supported by said base;
 said housing means including means for key notch cutting and means for indicating key notch depth;
 said housing and said key securement means being movable with respect to one another such that said key notch cutting means is brought into register with said blank key according to said first coded set of indicia of said template key;
 the key securement means comprising a movable carriage block defining a pair of tubular passageways for accommodating a pair of guide rails upon which the carriage block is reciprocated, the guide rails being suspended by bracket plates above said base;
 a pair of I-beam-shaped members, each of which is mounted alongside the carriage block, the I-beam-shaped members being particularly contoured to provide a shoulder on each side of said carriage block for securing the blank key in a vice;
 the vice, being formed between one of said I-beam-shaped members and said carriage block, being adjustable by a set screw which releases and tightens said key within said vice; and
 a pair of securement pawls, rotatably mounted at a forward end of said carriage block, said pawl forming a hook to secure said key and prevent twisting of said key out of its seat between said block and said I-beam.

5. An apparatus for duplicating a coded template key, having a shank including a plurality of pre-positioned notches along said shank, the depth and positioning of said notches corresponding to a first coded set of indicia on said key, said apparatus comprising:
 housing means movably mounted on a base;
 key securement means, securing at least a blank key, movably supported by said base;
 said housing means including means for key notch cutting and means for indicating key notch depth;
 said housing and said key securement means being movable with respect to one another such that said key notch cutting means is brought into register with said blank key according to said first coded set of indicia of said template key;

said key notch depth indicating means including a second set of indicia mounted by a first adjustable screw in an eccentric position and coded to correspond to said first set of indicia of said template key, wherein said key notch cutting means, being aligned with said indicating means, cuts notches into said blank key a depth encoded according to settings on said second set of indicia of said indicating means;

a third set of indicia is affixed to said housing;

said third set of indicia providing a reference setting for resetting said key notch depth indicating means so that the second set of indicia on said indicating means may be zerobalanced in order to compensate for wear to said key notch cutting means;

said third set of indicia being mounted upon a forward wall of said housing means adjacent said key notch depth indicating means and providing a scale against which said indicating means may be referenced.

6. The apparatus for duplicating a coded template key as in claim 1, wherein said means for positioning and aligning said blank key includes:

a tip locator pin, being of substantially elongated and rectangular shape, said pin being positioning within said key securement means adjacent one of a pair of set screw means, farthest from said cutter wheel, so that said pin is secured within said key securement means by said screw means;

said tip locator pin having a lateral groove across said pin, said groove being defined to receive said guide cam;

so that said cutter wheel and said guide cam may be aligned before key cutting begins, where no template key is physically secured to said key securement means.

7. The apparatus for duplicating a coded template key as in claim 4, wherein the key securement means further includes a tip locator pin, mounted within said key securement means within the vice formed nearest said key notch depth indicating means, wherein said tip locator pin provides means for determining the edge of said indicating means, whereby said indicating means may be aligned with said notch cutting means so that duplicate key, made where no template key is physically secured to the key securement means, may accurately be cut according to said programmed sequence of movements.

8. The apparatus for duplicating a coded template key as in claim 5, wherein a brush is affixed to a motor drive means, said motor drive means driving the notch cutting means and brushing the particulate material arising from the cutting operation clear of said apparatus.

9. An apparatus for duplicating a coded template key, having a shank including a plurality of pre-positioned notches along said shank, the depth and positioning of said notches corresponding to a first coded set of indicia on said key, said apparatus comprising:

housing means pivotally mounted about a first axis on a base;

key securement means, securing at least a blank key, movably supported by said base;

said housing means including means for key notch cutting rotating about a second axis orthogonal to said first axis and means for indicating and setting key notch cutting depth;

said housing and said key securement means being movable with respect to one another such that said key notch cutting means is brought into register with said blank key according to said first coded set of indicia of said template key.

10. An apparatus for duplicating a coded template key, as in claim 9, wherein said key notch cutting depth indicating means includes a second set of indicia mounted by a first adjustable screw in an eccentric position and coded to correspond to said first set of indicia of said template key, wherein said key notch cutting means, being aligned with said indicating means, cuts notches into said blank key a depth encoded according to settings on said second set of indicia of said indicating means.

11. An apparatus for duplicating a coded template key, as in claim 10, wherein, affixed to said housing, is a third set of indicia;

said third set of indicia providing a reference setting for resetting said key notch cutting depth indicating means so that the second set of indicia on said indicating means may be zero-balanced in order to compensate for wear to said key notch cutting means

* * * * *